United States Patent
Numajiri (10) Patent No.: US 8,264,097 B2
(45) Date of Patent: Sep. 11, 2012

(54) WIND TURBINE GENERATOR AND MAINTENANCE METHOD THEREOF

(75) Inventor: Tomohiro Numajiri, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/738,242

(22) PCT Filed: Jan. 28, 2010

(86) PCT No.: PCT/JP2010/051112
§ 371 (c)(1),
(2), (4) Date: Dec. 20, 2010

(87) PCT Pub. No.: WO2011/092812
PCT Pub. Date: Aug. 4, 2011

(65) Prior Publication Data
US 2012/0032546 A1    Feb. 9, 2012

(51) Int. Cl.
*H02K 1/18* (2006.01)
*H02K 1/30* (2006.01)

(52) U.S. Cl. 290/55; 310/420; 310/254.1; 310/216.113; 310/156.12

(58) Field of Classification Search ............... 290/55; 310/216.113, 216.114, 216.116, 216.118, 310/216.121, 156.12, 418, 419, 420, 422, 310/424, 425, 427, 254.1, 265–266
See application file for complete search history.

(56) References Cited

U.S. PATENT DOCUMENTS

| | | | | |
|---|---|---|---|---|
| 5,844,341 | A * | 12/1998 | Spooner et al. | 310/112 |
| 6,781,276 | B1 * | 8/2004 | Stiesdal et al. | 310/254.1 |
| 6,911,741 | B2 * | 6/2005 | Pettersen et al. | 290/44 |
| 7,956,484 | B2 * | 6/2011 | Stiesdal | 290/55 |
| 8,084,879 | B2 * | 12/2011 | Stiesdal | 290/55 |
| 2007/0278979 | A1 * | 12/2007 | Hashimoto et al. | 318/538 |
| 2008/0199309 | A1 * | 8/2008 | Bagepalli et al. | 415/170.1 |
| 2008/0309086 | A1 * | 12/2008 | Takaichi et al. | 290/52 |
| 2010/0066096 | A1 * | 3/2010 | Stiesdal | 290/55 |

FOREIGN PATENT DOCUMENTS

| | | |
|---|---|---|
| JP | 2005538305 A | 12/2005 |
| JP | 2006046107 A | 2/2006 |
| WO | 2005075822 A1 | 8/2005 |
| WO | 2007/111425 A1 | 10/2007 |

OTHER PUBLICATIONS

ISR and WO for PCT/JP2010/051112 dated Mar. 16, 2010.

* cited by examiner

*Primary Examiner* — Burton Mullins
(74) *Attorney, Agent, or Firm* — Kanesaka Berner & Partners LLP (57) ABSTRACT

A wind turbine generator includes: a main shaft; a generator having a rotor and a stator; and a sleeve coupled to the rotor and inserted onto the main shaft. The stator includes: stator magnetic poles arrayed circumferentially of the main shaft; and first and second stator plates rotatably coupled to the main shaft to support the stator magnetic poles. The rotor includes: rotor magnetic poles and at least one magnetic pole supporting structure coupled to the main shaft to support the rotor magnetic poles and provided between the first and second stator plates such that the rotor and stator magnetic poles are detachable from the sleeve. Positions at which the rotor and stator magnetic poles are detachable from the sleeve are closer to the main shaft from a closer end of the main shaft to the generator.

7 Claims, 7 Drawing Sheets

WIND TURBINE GENERATOR AND MAINTENANCE METHOD THEREOF

RELATED APPLICATIONS

The present application is national phase of, and claims priority from, International Application Number PCT/JP2010/051112, filed Jan. 28, 2010, the disclosure of which is hereby incorporated by reference herein in its entirety.

TECHNICAL FIELD

The present invention relates to a wind turbine generator, in particular, to a generator structure in the wind turbine generator.

BACKGROUND ART

One known structure as a coupling structure between a main shaft and a generator rotor in the wind turbine generator is a structure where the generator rotor is coupled to a cylindrical sleeve and the sleeve is fastened to the main shaft. Such a structure is disclosed, for example, in International Publication Pamphlet WO2007/111425A1 (Patent Literature 1). Patent Literature 1 discloses a coupling structure where a rotor bearing (corresponding to a sleeve in the present application) to which a generator rotor is joined is fastened to a main shaft by shrink disk (corresponding to a shrink fit in the present application). In the coupling structure, the shrink disk is positioned between a generator and a bearing, where the rotor bearing is fastened to the main shaft. The shrink click includes a fixed disk and a movable disk and the fixed disk and the movable disk are coupled to each other by a bolt. The bolt is inserted in parallel with a central axis of the main shaft. When the bolt is fastened, the movable disk is pushed to the fixed disk so that an inner diameter of the shrink disk is reduced and the rotor bearing is fastened to the main shaft.

One problem in the structure where the sleeve is fastened to the main shaft is a difficulty in work operations for unfastening the sleeve from the main shaft and inserting the sleeve onto the main shaft. In order to secure fastening strength, it is preferable that the clearance between the sleeve and the main shaft is narrow. From such a viewpoint, the clearance between the sleeve and the main shaft is typically adjusted to about 0.1 mm. However, a narrow clearance between the sleeve and the main shaft makes it difficult to perform work operations for detaching the sleeve from the main shaft and inserting the sleeve onto the main shaft.

This problem is especially important when generator replacement is required after the wind turbine generator is installed. After the installation of the wind turbine generator is completed, it is very difficult to perform work operations such as detaching the sleeve from the main shaft over the tower and inserting the sleeve onto the main shaft. For example, in a wind turbine generator with an output of 5 MW class, the weight of the generator exceeds 100 tones. When wind turbine generator replacement is performed over the tower, the replacement must be performed while the generator is hoisted by a crane; however, it is significantly difficult to perform work operations for detaching the sleeve from the main shaft and inserting the sleeve onto the main shaft, while a heavy generator is being hoisted by a crane.

CITATION LIST

Patent Literature
Patent Literature 1: International Publication Pamphlet WO2007/111425 A1

SUMMARY OF INVENTION

Therefore, an object of the present invention is to provide a technique for facilitating generator replacement in a wind turbine generator.

In one aspect of the present invention, a wind turbine generator is provided with: a main shaft which supports a wind turbine rotor; a main bearing which rotatably supports the main shaft; a generator provided with a generator rotor and a stator; and a sleeve coupled to the generator rotor and is inserted onto the main shaft. The stator is provided with: stator magnetic poles arrayed in the circumferential direction of the main shaft; and first and second stator plates which are coupled to the main shaft relatively rotatably thereto to support the stator magnetic poles and arranged in the axial direction of the main shaft. The generator rotor is provided with: rotor magnetic poles arrayed in the circumferential direction; and at least one magnetic pole supporting structure coupled to the main shaft to support the rotor magnetic poles and provided between the first and second stator plates. The first and second stator plates and the rotor magnetic pole supporting structure are configured such that the rotor magnetic poles and the stator magnetic poles are detachable from the sleeve. With respect to the first and second stator plates and the rotor magnetic pole supporting structure, positions at which the rotor magnetic poles and the stator magnetic poles are detached from the sleeve are closer to the main shaft as reduction of distances from a closer end of the main shaft to the generator.

In one embodiment, the first stator plate is positioned farther from the end of the main shaft closer to the generator than the second stator plate, the first stator plate includes a first plate member coupled to the sleeve and a second plate member coupled to the stator magnetic poles and detachable from the first plate member, while the rotor magnetic pole supporting structure includes a first supporting member coupled to the sleeve and a second supporting member coupled to the rotor magnetic poles and detachable from the first supporting member, and the second stator plate includes a third plate member coupled to the sleeve and a fourth plate member coupled to the stator magnetic poles and detachable from the third plate member. In this case, it is preferable that an end of the second plate member closer to the sleeve is separated farther from the main shaft than an end of the first supporting member closer to the rotor magnetic poles, and an end of the second supporting member closer to the sleeve is separated farther from the main shaft than an end of the third plate member closer to the stator magnetic poles.

It is preferable that at least one of the first and second stator plates is provided with an opening at a position corresponding to a position where the rotor magnetic poles are separated from the sleeve in the rotor magnetic pole supporting structure.

It is preferable that, when the at least one rotor magnetic pole supporting structure includes a plurality of rotor magnetic pole supporting structures arrayed in the axial direction of the main shaft, positions where the rotor magnetic poles are detached from the sleeve are closer to the main shaft according to reduction of distances from the end of the main shaft in each of the plurality of rotor magnetic pole supporting structures.

In an embodiment, it is preferable that the first stator plate and the rotor magnetic pole supporting structure are provided to oppose each other, and the first stator plate and the rotor magnetic pole supporting structure are each provided with an attachment structure for attaching a temporary fixing tool which temporarily fixes the first stator plate and the rotor magnetic pole supporting structure. In this case, the temporary fixing tool may include a wedge or a rod-shaped member and the attachment structures may be openings into which the temporary fixing tool is inserted.

It is preferable that, when an opening used for maintenance work is provided through at least one of the first and second stator plates, a maintenance method for the wind turbine generator includes: a step of performing a work operation for fastening a first supporting member coupled to the sleeve of the rotor magnetic pole supporting structure and a second supporting member coupled to the rotor magnetic pole or a work operation for detaching the second supporting member from the first supporting member, within a protective tube.

The present invention facilitates a replacement of a generator in a wind turbine generator.

DESCRIPTION OF EMBODIMENTS

Figure 1:
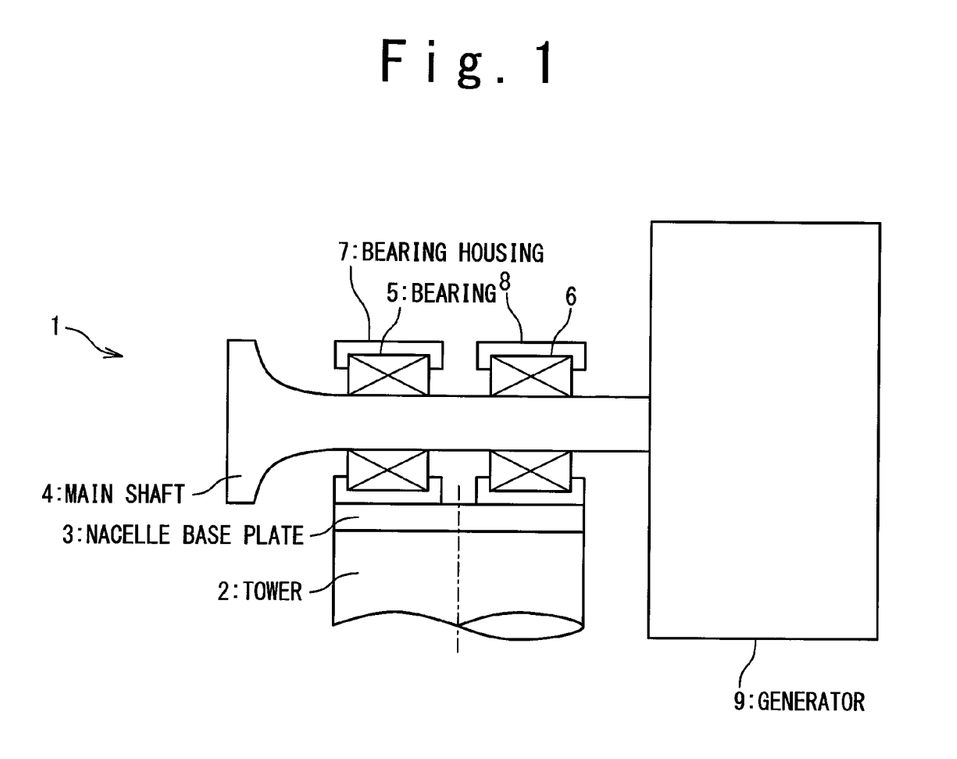
FIG. 1 is a diagram schematically showing a structure of a wind turbine generator in an embodiment of the present invention.

FIG. 1 is a diagram schematically showing a structure of a wind turbine generator 1 in one embodiment of the present invention. The wind turbine generator 1 of this embodiment is provided with a tower 2, a nacelle base plate 3, a main shaft 4, bearings 5 and 6, bearing housings 7 and 8, and a generator 9. The nacelle base plate 3 is rotatably attached on the top of the tower 2 to allow yaw rotation. The main shaft 4 is rotatably supported by the two bearings 5 and 6, and the bearings 5 and 6 are fixed on the nacelle base plate 3 with the bearing housings 7 and 8. One end of the main shaft 4 is coupled with a wind turbine rotor (not shown), while the other end thereof is coupled with the rotor of the generator 9. In the wind turbine generator 1 of this embodiment, the main shaft 4 is shared by the wind turbine rotor and the generator rotor, so that the wind turbine generator 1 of this embodiment is configured as a so-called direct drive wind turbine generator.

Figure 2A:
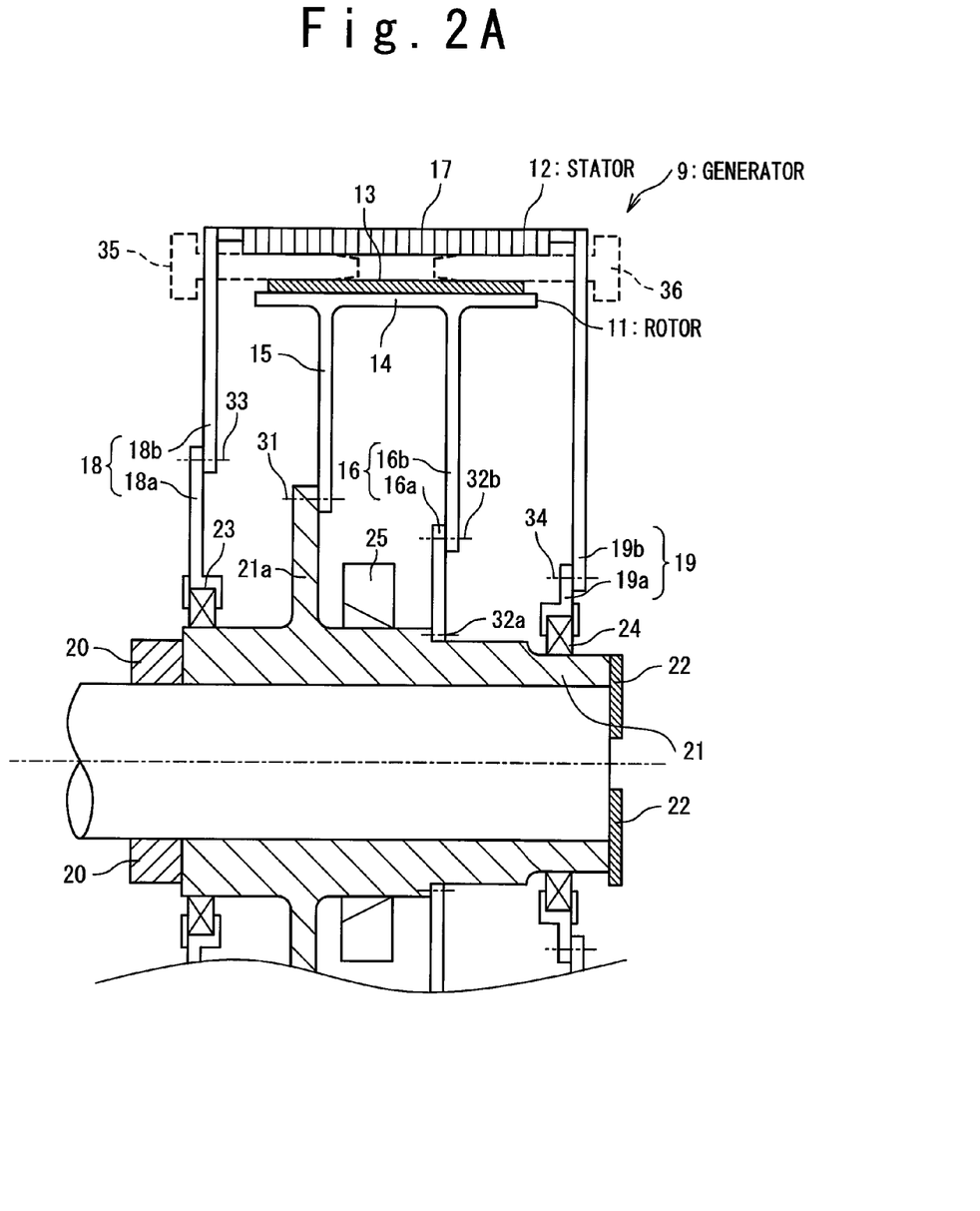
FIG. 2A is a diagram showing a structure of a generator in an embodiment of the present invention in detail.

FIG. 2A is a sectional view showing the structure of the wind turbine generator 1 in this embodiment, especially, the structure of the generator 9 in detail. The generator 9 is provided with a generator rotor 11 and a stator 12. The generator rotor 11 is coupled to a sleeve 21, and the sleeve 21 is fastened onto the main shaft 4 by a hydraulic shrink fit 25 so that the generator rotor 11 is coupled to the main shaft 4. The hydraulic shrink fit 25 is provided with a fixed ring 25a and a movable ring 25b. When hydraulic fluid (typically, hydraulic oil) is supplied to a port provided in the hydraulic shrink fit 25, the movable ring 25b is moved so that the inner diameter of the hydraulic shrink fit 25 is reduced to fasten the sleeve 21 to the main shaft 4. It is advantageous that the hydraulic shrink fit 25 is provided within the generator 9, because this reduces the bowing of the main shaft 4 by reducing the distance between the bearing 6 and the generator 9.

In addition, an end plate 22 is used to prevent displacement of the sleeve 21 in the axial direction (the direction parallel to the center line of the main shaft 4; the same goes for the following). Specifically, the end plate 22 is attached to bridge the end of the sleeve 21 and the end of the main shaft 4, and the sleeve 21 is sandwiched between the a bearing fixing ring 20 and the endplate 22, the bearing fixing ring 20 fixing the bearing 6. This suppresses the movement of the sleeve 21 in the axial direction.

As described below in detail, the generator 9 has a dividable structure in this embodiment, so that the generator 9 can be replaced without detaching the sleeve 21 from the main shaft 4. The fact that the generator 9 can be replaced without detaching the sleeve 21 from the main shaft 4 has an advantage that the generator replacement is facilitated. The structure of the generator 9 will be explained below in detail.

The generator rotor 11 is provided with field magnets 13 functioning as rotor magnetic poles, a back plate 14 supporting the field magnets 13, and rotor plates 15 and 16 for supporting the back plate 14. The rotor plate 16 includes a plurality of plate members 16a and 16b. The rotor plate 15 is fastened to a flange 21a of the sleeve 21 by bolts 31. On the other hand, the plate member 16a of the rotor plate 16 is fastened to the sleeve 21 by bolts 32a, and the plate member 16b is fastened to the plate member 16a by bolts 32b. Here, it should be noted that a plurality of bolts 31, 32a, and 32b are actually arrayed in circumferential direction, although only one of the bolts 31, one of the bolts 32a, and one of the bolts 32b are shown in the illustration.

On the other hand, the stator 12 is provided with a stator winding 17 functioning as stator magnetic poles and stator plates 18 and 19 supporting the stator winding 17. The stator plate 18 includes a plurality of plate members 18a and 18b, and the stator plate 19 similarly includes a plurality of plate members 19a and 19b. A generator bearing 23 is fixed to the inner end of the plate member 18a of the stator plate 18, and the plate member 18b is fastened to the outer end of the plate member 18a by bolts 33. Similarly, a generator bearing 24 is fixed to the inner end of the plate member 19a of the stator plate 19, and the plate member 19b is fastened to the outer end of the plate member 19a by bolts 34. In such a structure, the generator 9 is also supported by the main shaft 4 with the generator bearings 23 and 24. This structure is effective for dispersing the mechanical load caused by the weight of the generator 9. Here, it should be noted that a plurality of bolts 33 and 34 are arrayed in the circumferential direction, although only one of the bolts 33 and one of the bolts 34 are shown in the illustration.

Here, it should be noted that the bolts 33 fastening the plate members 18a and 18b of the stator plate 18, the bolts 31 fastening the flange 21a of the sleeve 21 and the rotor blade 15, the bolts 32b fastening the plate members 16a and 16b of the rotor plate 16, and the bolts 34 fastening the plate members 19a and 19b of the stator plate 19 are arranged such that their distances from the central axis of the main shaft 4 are increased as the separations from the end of the main shaft 4 on the side of the generator 9. That is, such an arrangement is adopted that the positions of fastening fixtures for coupling the field magnets 13 and the stator winding 17 to the sleeve 21 from the central axis of the main shaft 4 are farther from the end of the main shaft 4, as the distances thereof are farther.

Figure 2B:
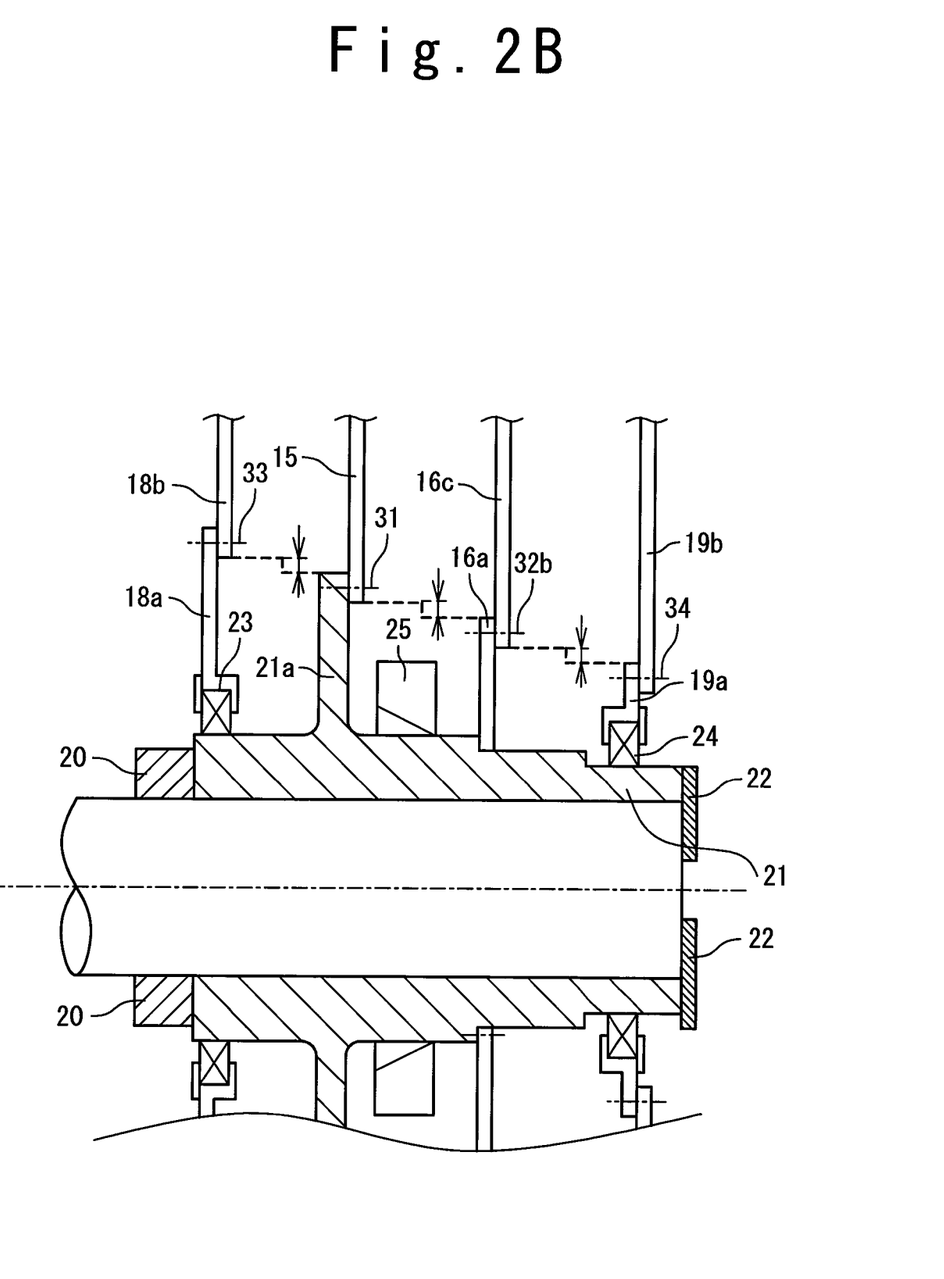
FIG. 2B is a diagram showing in detail a structure of a portion where a generator rotor and a stator are coupled to a sleeve in an embodiment of the present invention.

More specifically, as shown in FIG. 2B, the position of the closer end of the plate member 18b of the stator plate 18 to the sleeve 21 is farther from the central axis of the main shaft 4 than the positions of the closer ends of the flange 21a, the plate member 16a of the rotor plate 16, the plate member 19a of the stator plate 19 to the stator winding 17. Further, the position of the closer end of the rotor plate 15 to the sleeve 21 is farther from the central axis of the main shaft 4 than the positions of the closer ends of the plate member 16a of the rotor plate 16 and the plate member 19a of the stator plate 19 to the stator winding 17. Furthermore, the position of the closer end of the plate member 16b of the rotor plate 16 to the sleeve 21 is farther from the central axis of the main shaft 4 than the position of the closer end of the plate member 19a of the stator plate 19 to the stator winding 17. Here, it should be noted that the flange 21a and the plate member 16a are members coupled to the sleeve 21 to remain when the field magnets 13 are detached from the sleeve 21 in the rotor magnetic pole supporting structure supporting the field magnets 13, and the plate member 19a of the stator plate 19 is a member coupled to the sleeve 21 to remain when the stator winding 17 is detached from the sleeve 21.

Figure 2C:
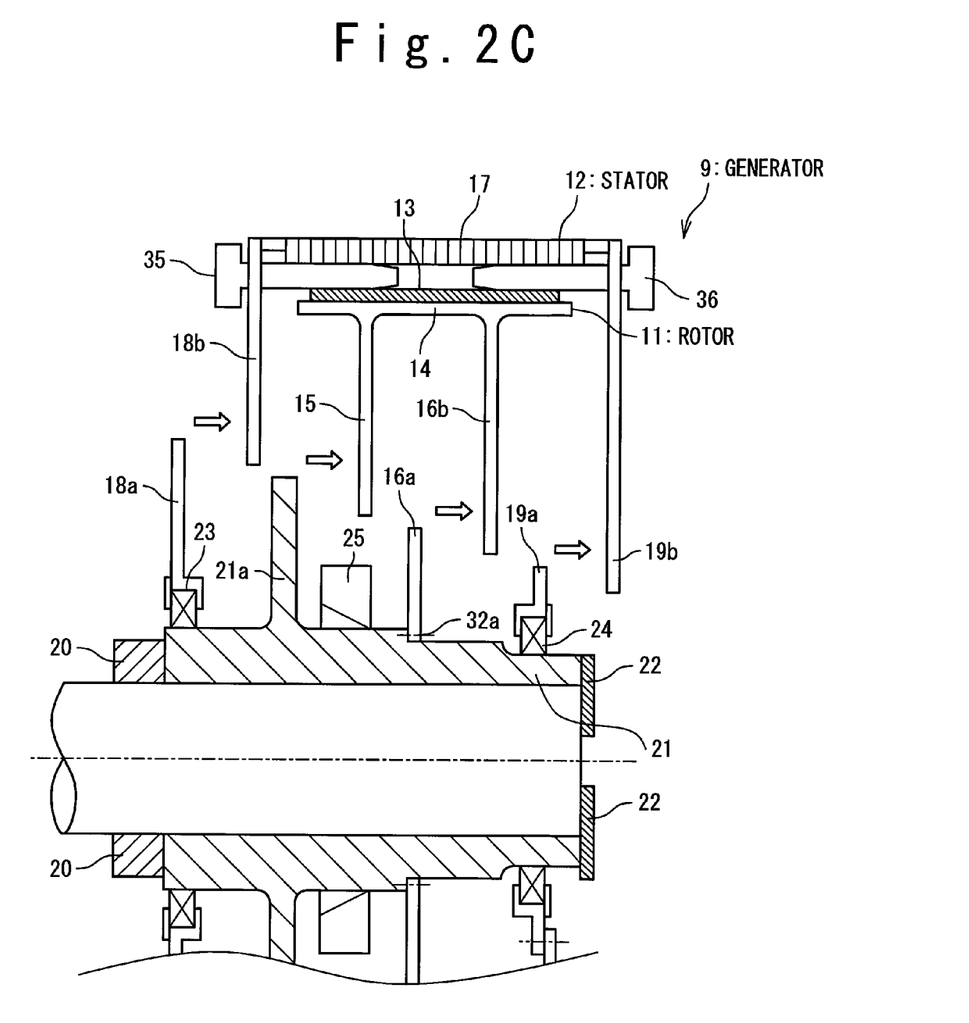
FIG. 2C is a diagram showing a state where the generator rotor and the stator have been separated from the sleeve.

As shown in FIG. 2C, the use of the above-mentioned structure allows the field magnets 13 of the generator rotor 11 and the stator winding 17 of the stator 12 to be detached without detaching the sleeve 21 from the main shaft 4 in the wind turbine generator 1 of this embodiment, when maintenance work is performed. Specifically, by unfastening and removing the bolts 33 and 34, the stator winding 17 can be detached together with the plate members 18b and 19b. Similarly, by unfastening and removing the bolts 31 and 32b, the field magnets 13 can be detached together with the back plate 14, the rotor plate 15, and the plate member 16b. Here, the use of the structure shown in FIG. 2B avoids the interference between members during detaching work of the generator 9.

On the contrary, the stator winding 17 can be reattached through attaching the stator winding 17 to the plate members 18a and 19b and fastening the bolts 33 and 34 to the plate members 18a and 19b. Further, the field magnets 13 can be reattached through attaching the field magnets 13 to the back plate 14 and attaching the rotor plate 15 and the plate member 16b to the back plate 14 by fastening the bolts 31 and 32b. As thus described, replacement of most important configuration members (the field magnets 13, the stator winding 17) can be performed without detaching the sleeve 21 from the main shaft 4 in the wind turbine generator 1 of this embodiment.

In addition, it is preferable for facilitating the work that the members detached together with the field magnets 13 and the stator winding 17 are positioned nearer to the end of the main shaft 4 than the members which remain together with the sleeve 21. With respect to the stator plate 18, for example, the plate member 18b, which is detached together with the stator winding 17, is fastened to a face of the plate member 18a, which remains together with sleeve 21, the face being closer to the end of the main shaft 4. As for the rotor plate 15, which is detached together with the field magnet 13, the rotor plate 15 is fastened to a face of the flange 21a of the sleeve 21, the face being closer to the end of the main shaft 4. As for the rotor plate 16, the plate member 16b, which is detached together with the field magnets 13, is fastened to a face of the plate member 16a, which remains together with the sleeve 21, the face being closer to the end of the main shaft 4. As for the stator plate 19, finally, the plate member 19b, which is detached together with the stator winding 17, is fastened to a face of the plate 19a, which remains together with the sleeve 21, the face being closer to the end of the main shaft 4. Such a structure preferably facilitates work operations for detaching the field magnets 13 and the stator winding 17.

Here, work operations for fastening the rotor plate 15 by the bolt 31 and for fastening the plate members 16a and 16b of the rotor plate 16 by the bolts 32a and 32b are performed within the generator 9. In the same way, work operations for detaching the bolt 31 from the rotor plate 15 and for detaching the bolts 32a and 32b from the plate members 16a and 16b are performed within the generator 9. When a foreign matter enters the generator 9 in these work operations, this may cause damage of the generator 9.

Figure 3:
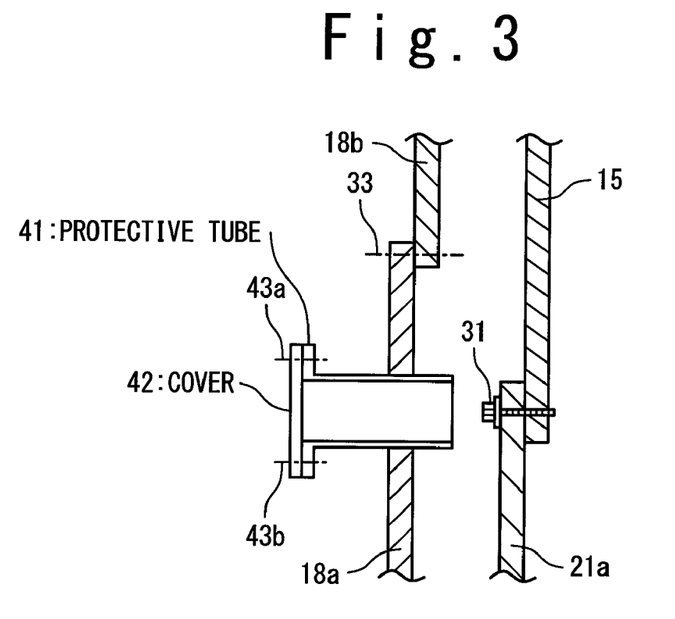
FIG. 3 is a diagram showing a preferred procedure for fastening a bolt within the generator.
Figure 4:
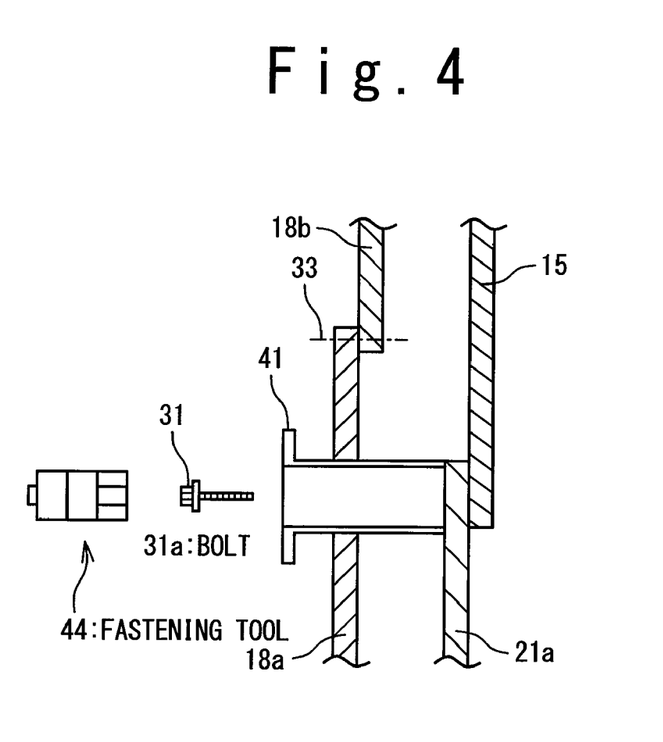
FIG. 4 is a diagram showing a preferred procedure for fastening the bolt within the generator.
Figure 5:
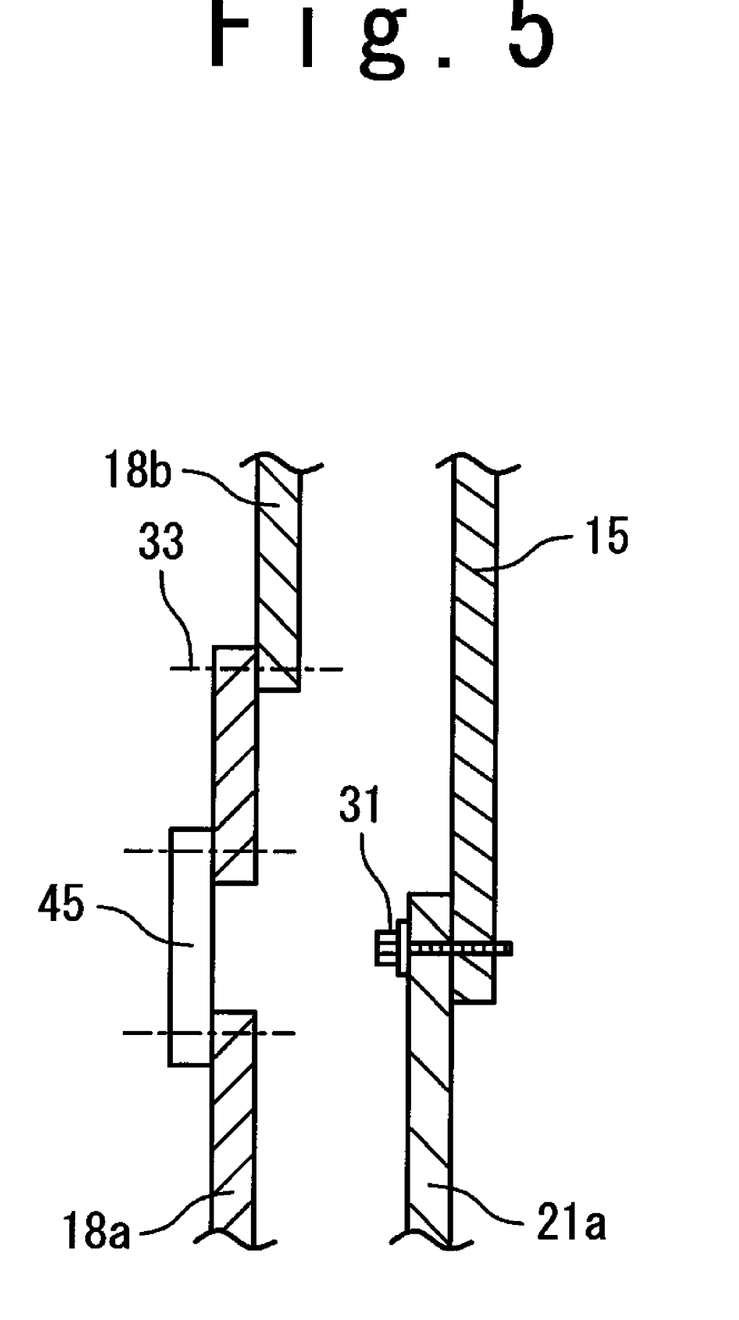
FIG. 5 is a diagram showing a preferred procedure for fastening the bolt within the generator.

In order to avoid damage of the generator 9 due to entry of a foreign matter, it is preferable that work operations for fastening the bolts 31, 32a, and 32b or detaching them are performed within a protective tube inserted from the stator plate 18 or 19. FIGS. 3 to 5 are conceptual diagrams showing a procedure of performing fastening of the bolts 31 within a protective tube 41.

As shown in FIG. 3, an opening is formed through the plate member 18a of the stator plate 18 at a position corresponding to the bolts 31. The protective tube 41 is inserted into the opening in performing maintenance works. At this time, the generator rotor 11 is adjusted at such an angle that a target bolt 31 can be received in the protective tube 41. The protective tube 41 is inserted to abut on the flange 21a of the sleeve 21. At this time, in order to prevent a foreign matter from entering the protective tube 41, it is preferable that the protective tube 41 is inserted into the opening with a cover 42 attached to the inlet of the protective tube 41. In this embodiment, the cover 42 is detachably attached to the protective tube 41 by bolts 43a and 43b. Subsequently, the cover 42 is detached from the protective tube 41 and the target bolt 31 is fastened. At this time, as shown in FIG. 4, the use of a dedicated fastening tool 44 with a diameter thinner than the inner diameter of the protective tube 41 for fastening the bolt 31 facilitates the work operation. This is followed by drawing out the protective tube 41 to a position where the protective tube 41 does not interfere with the rotor plate 15, after the cover 42 is attached to the protective tube 41 again. Further, the generator rotor 11 is slightly rotated such that the protective tube 41 reaches a position corresponding to a bolt 31 to be fastened next. The bolts 31 are sequentially fastened through repetition of similar process subsequent thereto. After all the bolts 31 are fastened, the opening of the plate member 18a of the stator plate 18 is closed by a cover 45, as shown in FIG. 5. According to the above procedure, entry of a foreign matter into the generator 9 can be avoided during the work operation.

Similarly, entry of a foreign matter into the generator 9 can be also avoided through performing work operations for detaching the bolts 31 within the protective tube 41.

As for the bolts 32b of the rotor plate 16, entry of a foreign matter can be avoided through fastening and detaching work is performed within the protective tube in the same manner as described above. In this case, an opening is formed through the plate member 19b of the stator plate 19 at a position corresponding to the bolt 32b, and the protective tube is inserted into the opening to abut on the plate member 16b.

The abovementioned procedure avoids entry of a foreign matter into the generator 9 in fastening the bolts 31 and 32b. This effectively avoids damage of the generator 9.

Referring back to FIG. 2A, it is preferable that attachment structures for attaching temporary fixing tools 35 and 36 which temporarily fixes the generator rotor 11 to the stator plates 18 and 19 are provided for the wind turbine generator 1 of this embodiment. The gap between the generator rotor 11 and the stator 12 is maintained through temporarily fixing the generator rotor 11 to the stator plates 18 and 19 using the temporary fixing tools 35 and 36 so that damage of the generator 9 is prevented, when the generator 9 is transported, for example. In the structure shown in FIG. 2A, wedges are used as the temporary fixing tools 35 and 36. In this case, openings into which the wedges are inserted are provided through the stator plates 18 and 19. By inserting the wedges between the generator rotor 11 and the stator 12 through the openings, the generator rotor 11 and the stator 12 can be fixed temporarily.

Figure 2D:
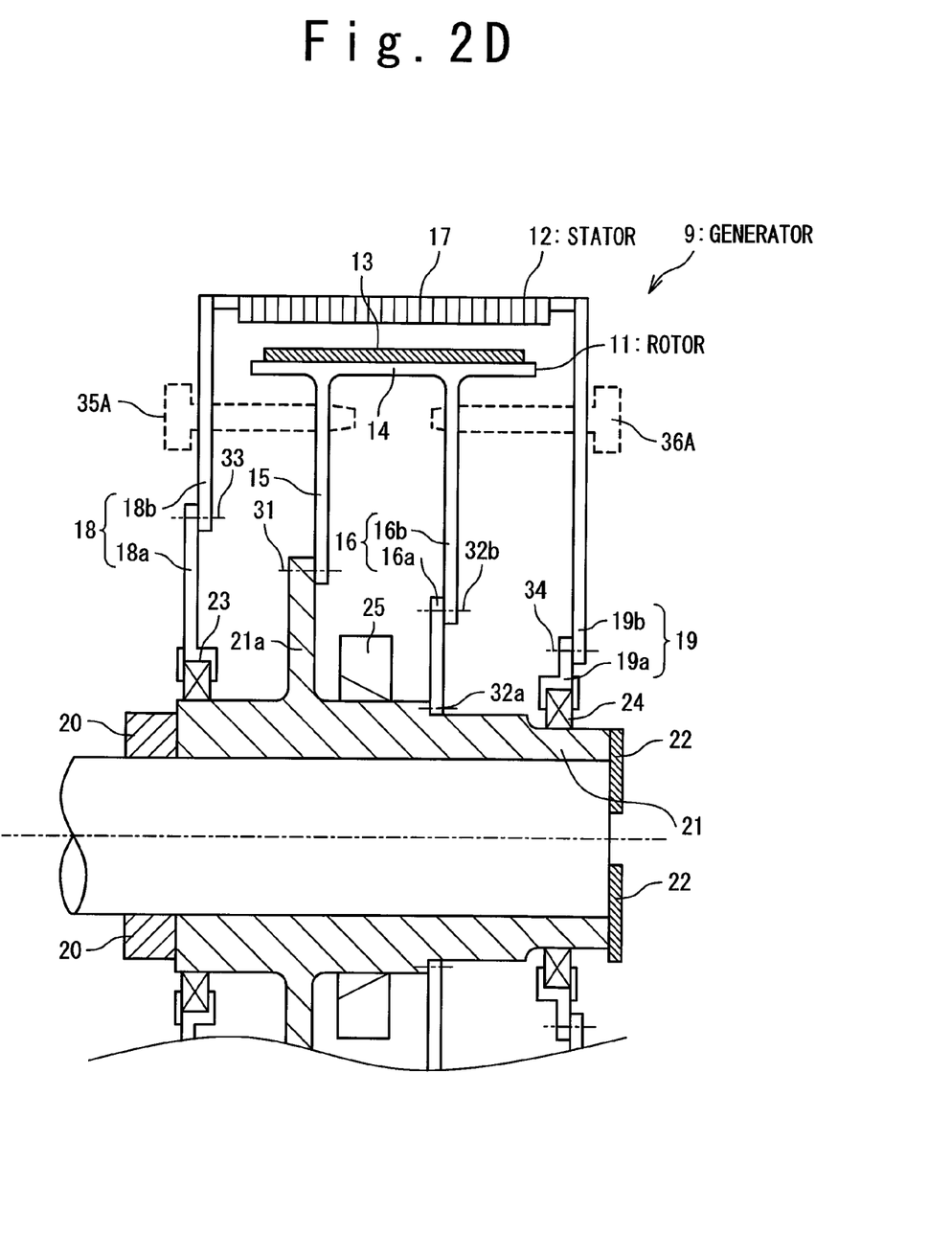
FIG. 2D is a diagram showing a structure of a generator in another embodiment of the present invention in detail.

In another embodiment, as shown in FIG. 2D, rod-shaped members such as pins may be used as the temporary fixing tools 35A and 36A. In this case, openings through which the rod-shaped members are inserted are provided through the stator plates 18 and 19 and the rotor plates 15 and 16. The generator rotor 11 can be fixed temporarily by inserting the rod-shaped members into the openings provided through the stator plates 18 and 19 and the rotor plates 15 and 16. Also, the temporary fixing tools 35 and 36 may be configured to temporarily connect the stator plates 18 and 19 and the back plates 14. The structure for temporarily fixing the generator rotor 11 to the stator plates 18 and 19 may be configured variously.

Although one embodiment of the present invention are described above, the present invention should not be interpreted to be limited to the above embodiments. Various modifications which are obvious to those skilled in the art may be adopted in the implementation of the present invention. Especially, although the rotor plates 15 and 16 are used as the coupling structure for coupling the field magnet 13 and the back plate 14 to the sleeve 21 in FIGS. 2A to 2D, it would be easily understood by those skilled in the art that the structure for coupling the field magnet 13 and the back plate 14 to the sleeve 21 may be modified variously.

The invention claimed is:

1. A wind turbine generator, comprising:
a main shaft which supports a wind turbine rotor;
a main bearing which rotatably supports said main shaft;
a generator provided with a generator rotor and a stator; and
a sleeve coupled to said generator rotor and inserted onto said main shaft,
wherein said stator includes:
stator magnetic poles arrayed in a circumferential direction of said main shaft; and
first and second stator plates coupled to said main shaft relatively rotatably thereto to support said stator magnetic poles and arranged in an axial direction of said main shaft,
wherein said generator rotor includes:
rotor magnetic poles arrayed in said circumferential direction; and at least one magnetic pole supporting structure coupled to said main shaft to support said rotor magnetic poles and provided between said first and second stator plates,
wherein said first and second stator plates and said rotor magnetic pole supporting structure are configured such that said rotor magnetic poles and said stator magnetic poles are detachable from said sleeve, and
wherein, with respect to said first and second stator plates and said rotor magnetic pole supporting structure, positions at which said rotor magnetic poles and said stator magnetic poles are detached from said sleeve are closer to said main shaft as the distance from said positions to a closer end of said main shaft of said generator diminishes.

2. The wind turbine generator, according to claim 1, wherein said first stator plate is positioned farther from the end of said main shaft and closer to said generator than said second stator plate,
wherein said first stator plate includes:
a first plate member coupled to said sleeve; and
a second plate member coupled to said stator magnetic poles and detachable from said first plate member,
wherein said rotor magnetic pole supporting structure includes:
a first supporting member coupled to said sleeve; and
a second supporting member coupled to said rotor magnetic poles and detachable from said first supporting member,
wherein said second stator plate includes:
a third plate member coupled to said sleeve; and
a fourth plate member coupled to said stator magnetic poles and detachable from said third plate member,
wherein an end of said second plate member closer to said sleeve is positioned farther from said main shaft than an end of said first supporting member closer to said rotor magnetic poles, and
wherein an end of said second supporting member closer to said sleeve is positioned farther from said main shaft than an end of said third plate member closer to said stator magnetic poles.

3. The wind turbine generator according to claim 1, wherein at least one of said first and second stator plates is provided with an opening at a position corresponding to a position where said rotor magnetic poles are detached from said sleeve in said rotor magnetic pole supporting structure.

4. A maintenance method for the wind turbine generator of claim 3, the method comprising:
a step of inserting a protective tube into said opening provided through said first stator plate, and
a step of performing a work operation for fastening a first supporting member coupled to said sleeve of the rotor magnetic pole supporting structure and a second supporting member coupled to said rotor magnetic pole or a work operation for detaching said second supporting member from said first supporting member, within a protective tube.

5. The wind turbine generator according to claim 1, wherein said at least one rotor magnetic pole supporting structure includes a plurality of rotor magnetic pole supporting structures arrayed in the axial direction of said main shaft, and
wherein positions where the rotor magnetic poles are detached from the sleeve are closer to the main shaft as the distance from said positions to the end of the main shaft in each of the plurality of rotor magnetic pole supporting structures diminishes.

6. The wind turbine generator according to claim 1, wherein said first stator plate and said rotor magnetic pole supporting structure oppose each other, and
wherein said first stator plate and said rotor magnetic pole supporting structure are each provided with an attachment structure for attaching a temporary fixing tool which temporarily fixes said first stator plate and said rotor magnetic pole supporting structure.

7. The wind turbine generator according to claim 6, wherein said temporary fixing tool may include a wedge or a rod-shaped member and the attachment structures may be openings into which the temporary fixing tool is inserted.

* * * * *